June 22, 1965
N. A. SCHUSTER
3,191,141
LOGGING TOOL HOUSING WITH ACOUSTIC DELAY
Filed May 16, 1961
7 Sheets-Sheet 1
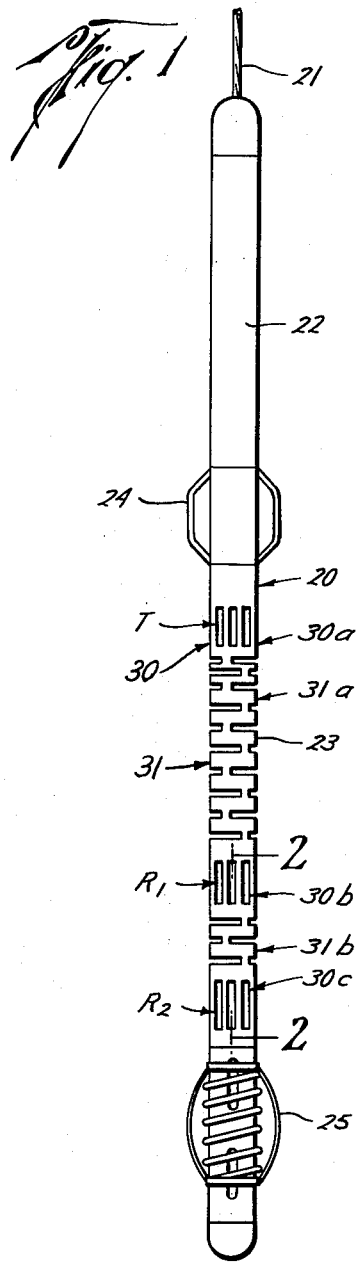
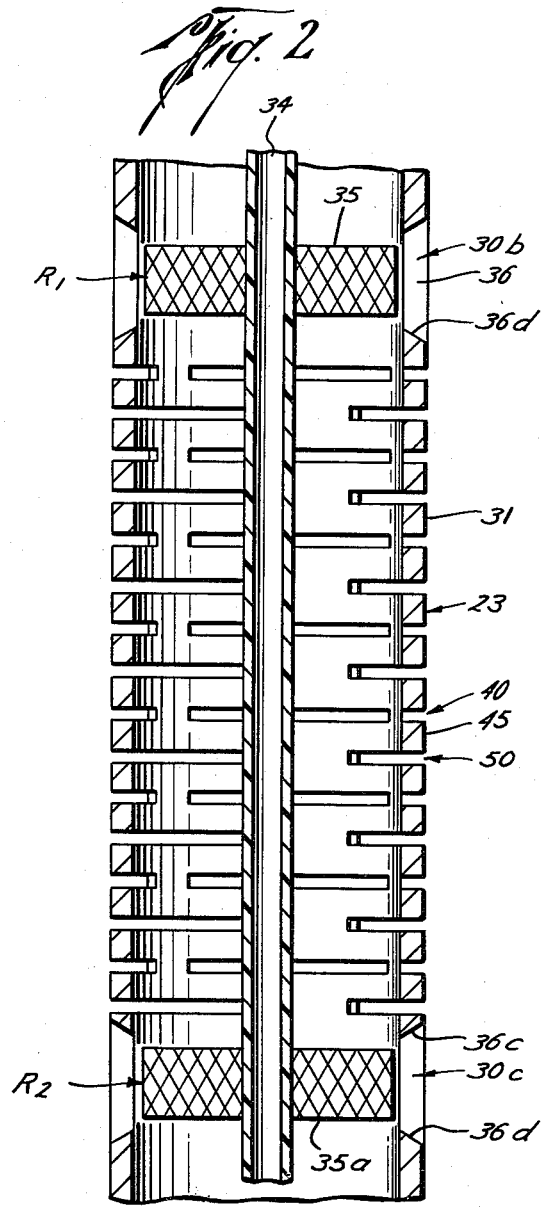
Nick A. Schuster
INVENTOR.
BY
ATTORNEY June 22, 1965 N. A. SCHUSTER 3,191,141
LOGGING TOOL HOUSING WITH ACOUSTIC DELAY
Filed May 16, 1961 7 Sheets-Sheet 2
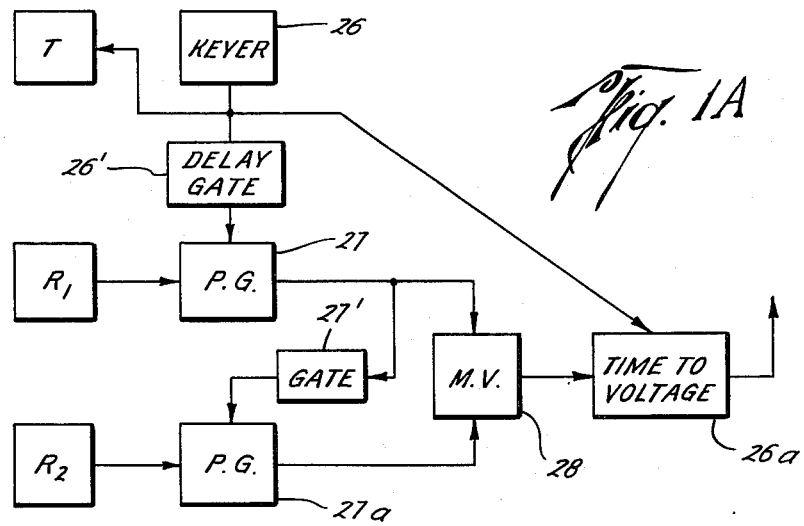
Fig. 1A
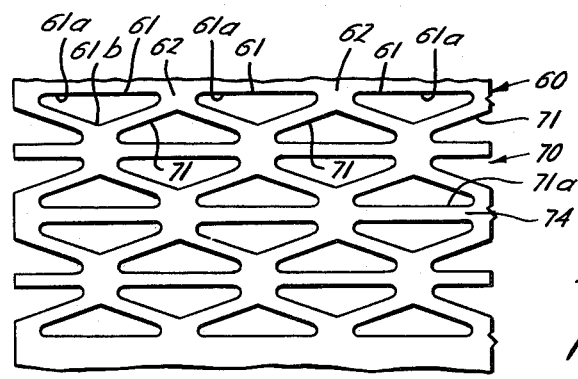
Fig. 7
Fig. 8
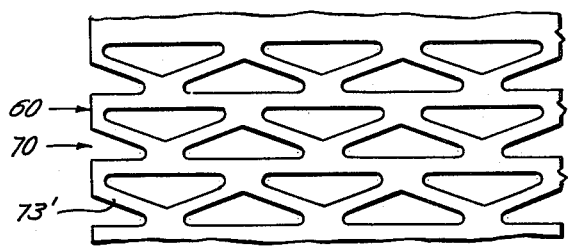
Nick A. Schuster
INVENTOR.
BY *Donald H. Fidler*
ATTORNEY June 22, 1965  N. A. SCHUSTER  3,191,141
LOGGING TOOL HOUSING WITH ACOUSTIC DELAY
Filed May 16, 1961  7 Sheets-Sheet 3
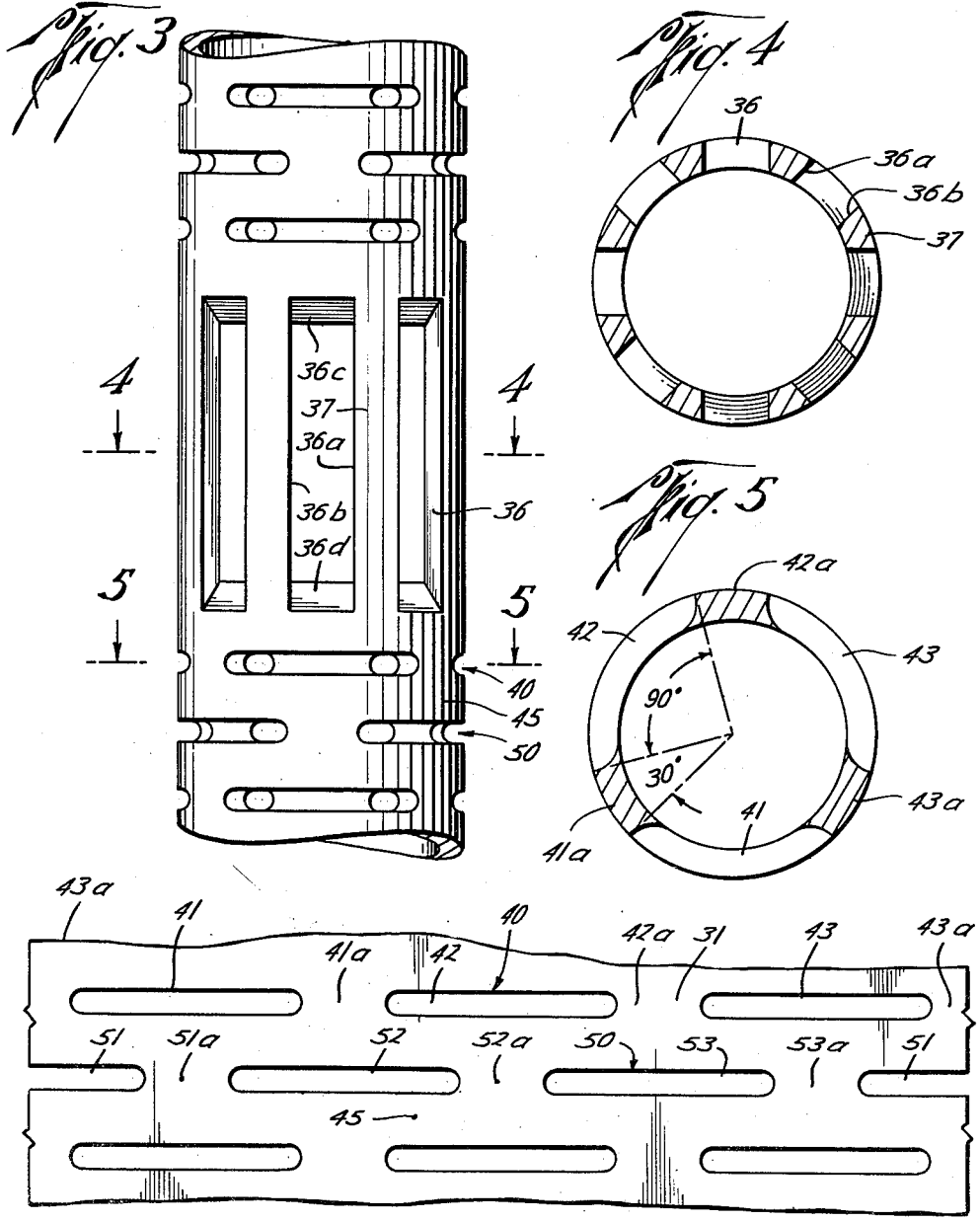
Nick A. Schuster
INVENTOR.
BY *Donald H. Fidler*
ATTORNEY

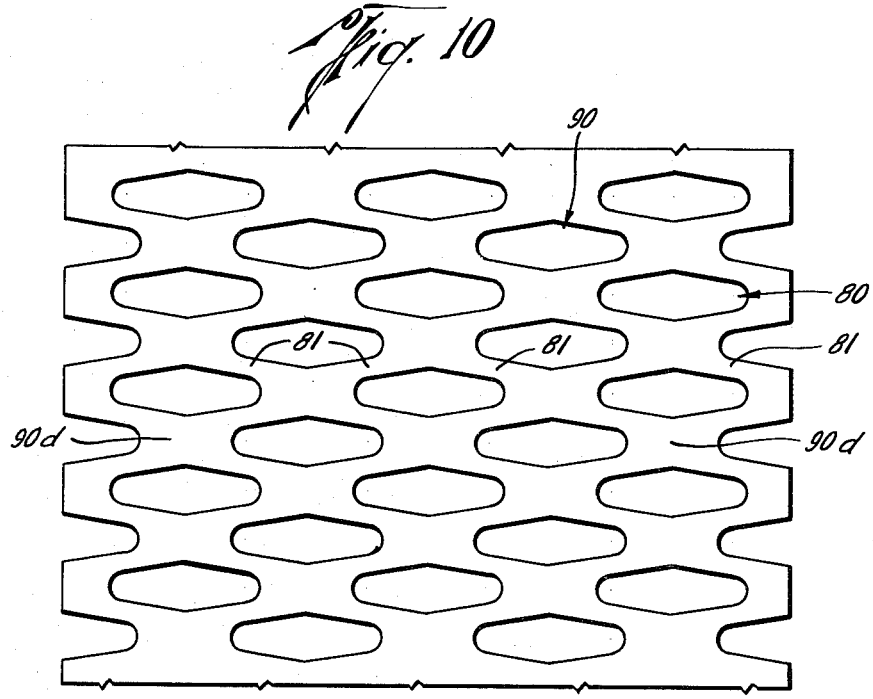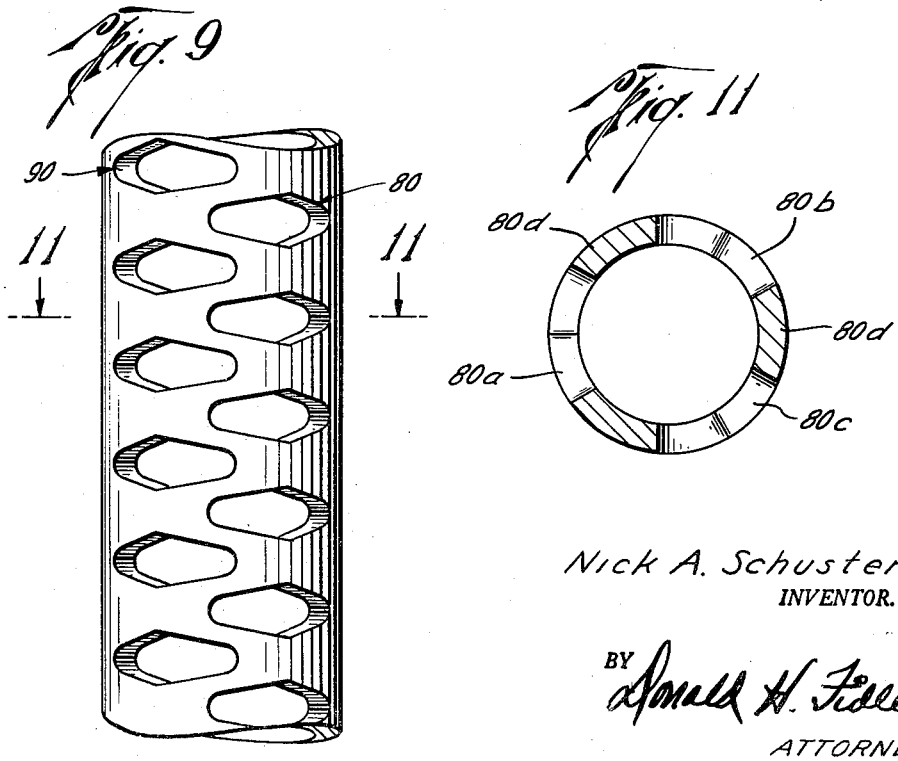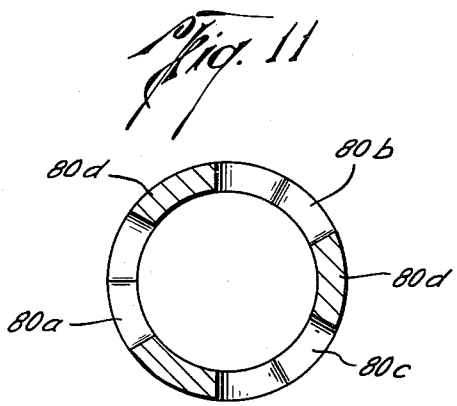

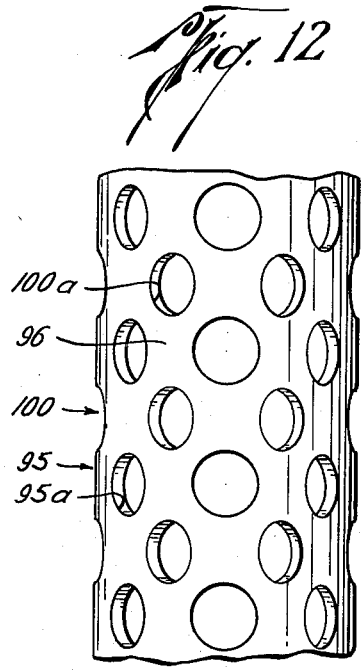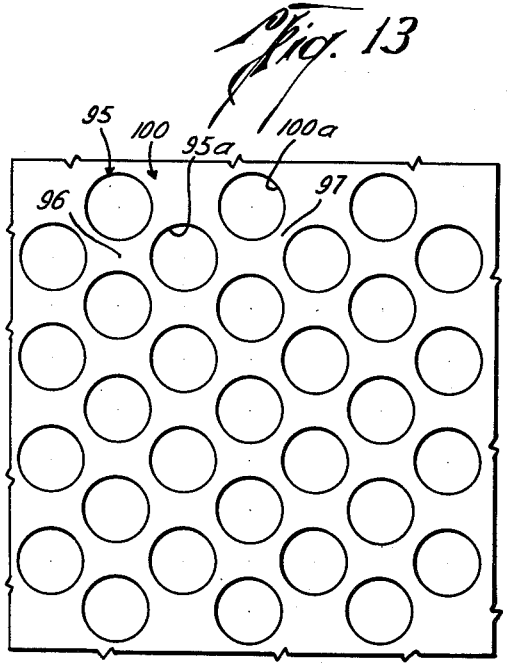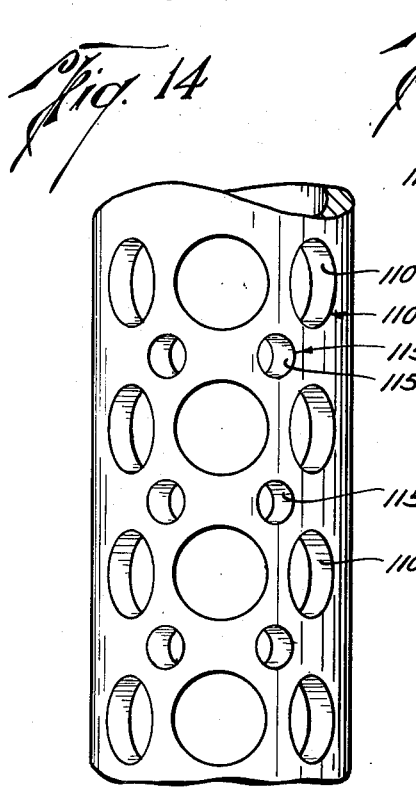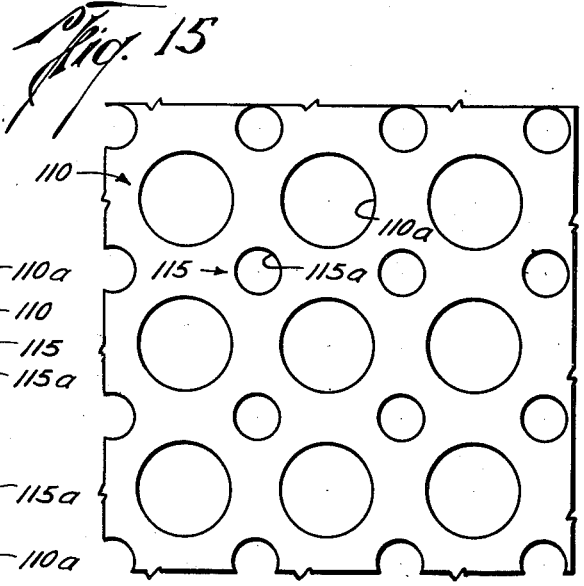
Nick A. Schuster
INVENTOR.
BY Donald H. Fidler
ATTORNEY

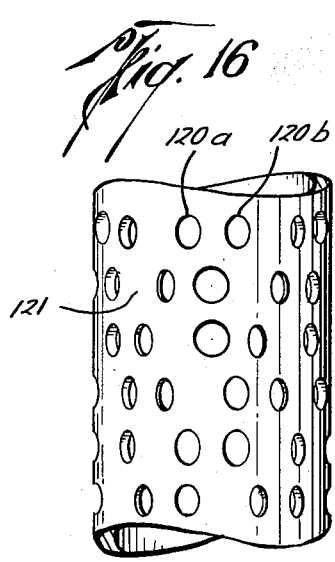
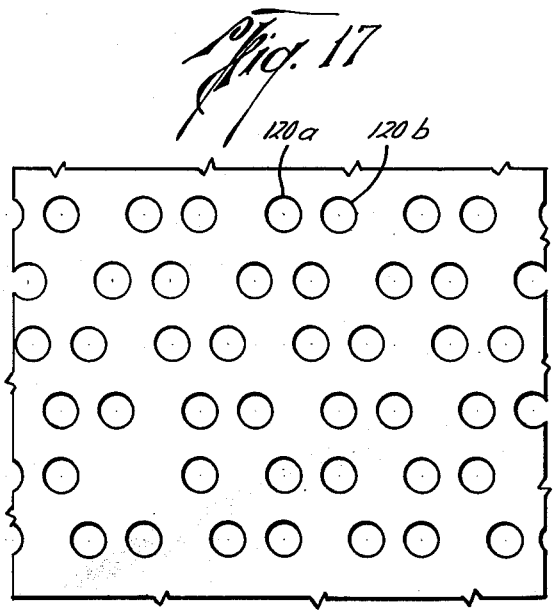
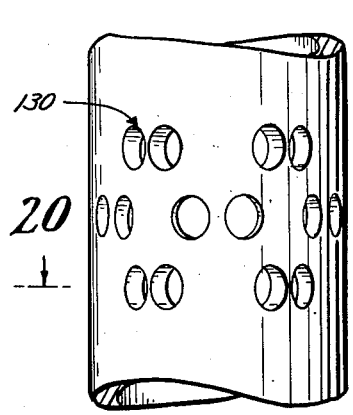
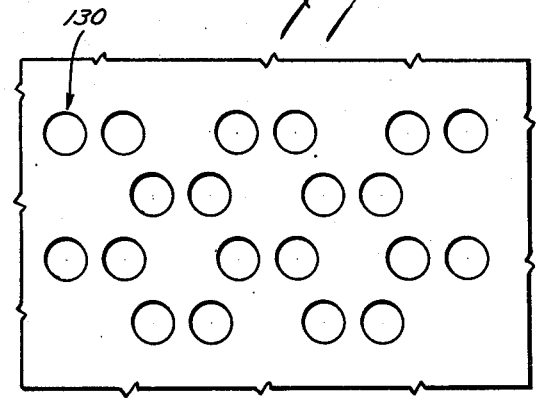
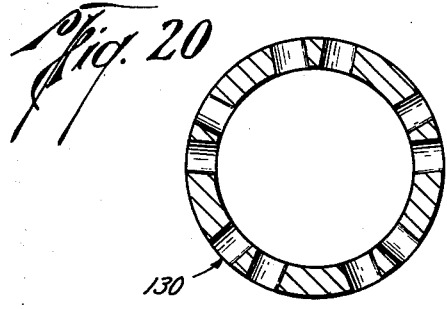

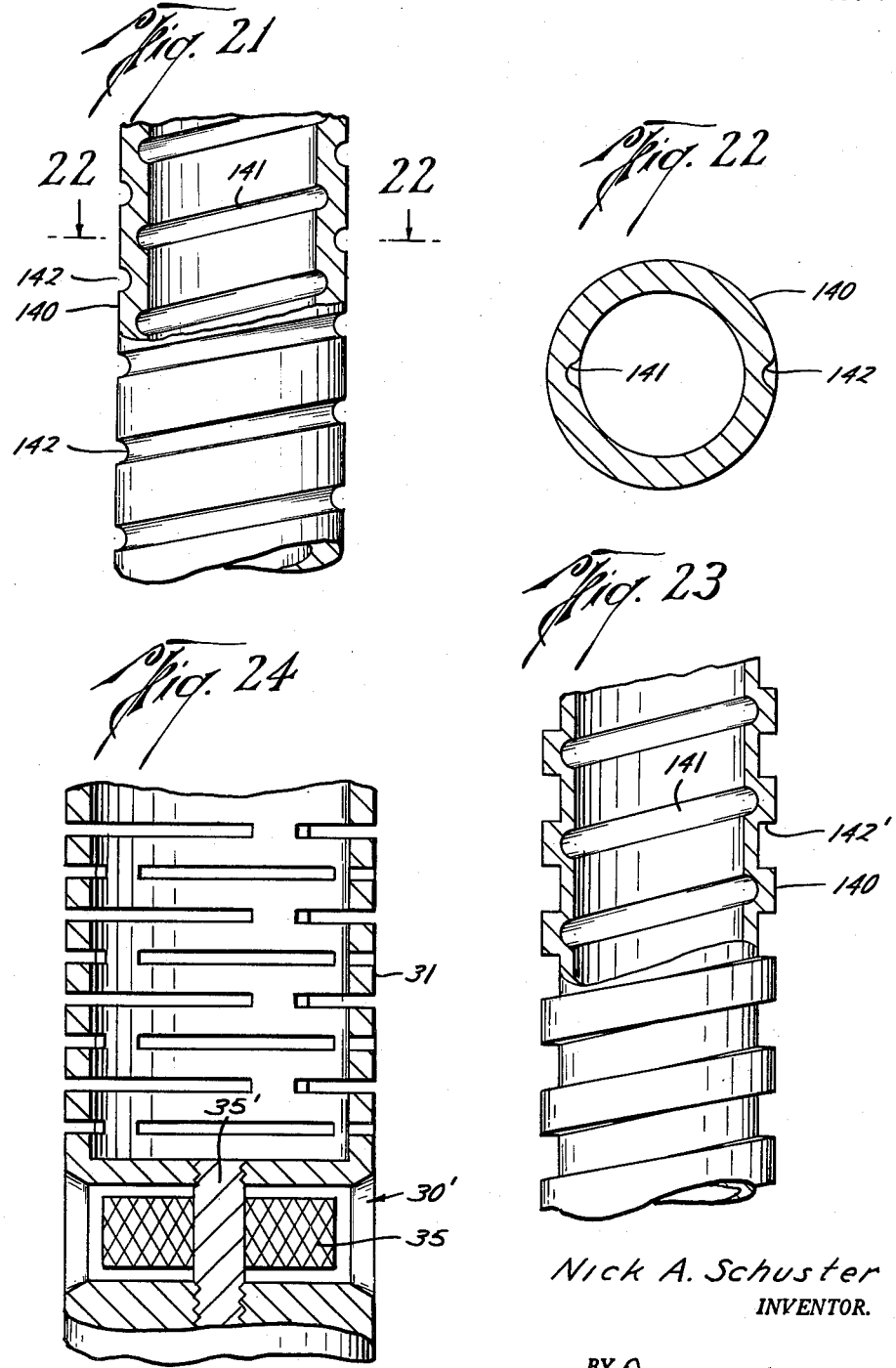

United States Patent Office 3,191,141
Patented June 22, 1965

3,191,141
LOGGING TOOL HOUSING WITH ACOUSTIC DELAY
Nick A. Schuster, Houston, Tex., assignor to Schlumberger Well Surveying Corporation, Houston, Tex., a corporation of Texas
Filed May 16, 1961, Ser. No. 110,468
22 Claims. (Cl. 340—17)

This invention relates to exploratory tools for use in well bores and, more particularly, to acoustic well logging tools which probe the media surrounding a well bore with pulses of acoustic energy.

An acoustic well logging tool is generally cylindrically shaped and suitably sized for passage through a fluid filled well bore. Normally, the tool carries two or more transducers which are disposed and secured at a fixed distance from one another. In a typical acoustic tool having three transducers, one of the transducers serves as a transmitter of sound waves while the remaining transducers serve as receivers of sound waves. The receivers are spaced from one another at a predetermined distance and are disposed to one side of the transmitter along the longitudinal axis of the tool. In operation, the transmitter in the tool is electrically actuated periodically to emit pulses of acoustic energy (or pressure waves) which propagate outwardly from the transmitter with a velocity dependent upon the media traversed by the energy. The arrival of the acoustic energy at the successively positioned receivers is detected to trigger a timing circuit in the tool which functions to ascertain the time required for a given pulse of acoustic energy to travel the predetermined distance between the two receivers. From a time measurement obtained by the timing circuit, a composite velocity of media traversed by an acoustic pulse can be determined. In turn, composite velocity indications can be correlated to specific types of earth formations or other media. Indications of travel time or velocity obtained in open boreholes can also be related to the porosity of earth formations. If desired, the timing function can be accomplished with only a single transmitter and receiver.

Acoustic energy as above discussed can be generated or intercepted by a piezoelectric or a magnetostrictive transducer in a well known manner.

In a typical open borehole, an acoustic tool is commonly spaced from the wall of the well bore so that the emitted acoustic wave energy or pressure pulses are first omnidirectionally transmitted through the fluid (usually mud) in the well bore and, after traveling through the fluid over the distance from the tool to the wall of the well bore, a portion of the traveling wave energy is transmitted to adjacent earth formations. The characteristic velocity of wave motion or the wave energy through the fluid in the well is generally in the neighborhood of 5000 feet per second, while the characteristic velocity of wave motion through the earth formations may vary from 5000 feet per second to 25,000 feet per second. Thus, the portion of the acoustic wave energy transmitted into the formations generally travels at a higher velocity than the corresponding portion of the wave energy traveling in the well bore fluid. Because of this, the portion of the wave energy traveling through earth formations reaches a receiver prior to the time that the portion of the acoustic wave energy traveling through the fluids does. It is this feature of higher formation velocity which permits measurement of the velocity of acoustic energy in earth formations surrounding a borehole.

Typically, each pulse of acoustic energy upon intercepting a receiver transducer generates an electrical signal containing a number of undulations, cycles or vibrations. The time measurement is generally based upon the detection of a given portion or characteristic of an electrical signal developed at the respective receivers for a given traveling pulse of acoustic energy. A commonly used characteristic of a corresponding electrical signal for detecting purposes, for example, is a voltage amplitude value. This is made possible because the undulations, cycles or vibrations of a typical electrical signal as developed from a typical pulse of acoustic energy generally include, in the first cycle, a first peak of a given polarity followed by a second peak of an opposite polarity and approximately three times the magnitude of the first peak and, in the second cycle, a third peak with a polarity similar to the first peak and about ten times the magnitude of the first peak. Hence, when a selected characteristic voltage amplitude value is exceeded, a detection signal for operating the timing circuit can be developed. The characteristic voltage amplitude value selected for detection purposes is generally such that detection will occur during the first cycle of a signal. The selection of a voltage amplitude characteristic of a first cycle of the signal to detect the first arrival of the acoustic signal is desirable because the voltage amplitude values of subsequent cycles are generally distorted because of acoustic reflections in the borehole.

From the foregoing discussion concerning the nature of acoustic wave propagation in an open borehole and timing of such propagation over a fixed distance, it is apparent that a suitable supporting means for the transducers must be incapable of passing detectable acoustic energy longitudinally between the transducers at a velocity higher than that of the adjacent earth formations. Obviously, if the supporting means are not so constructed, the receiver circuit would be triggered prematurely by the acoustic energy traveling through the support means thereby to prevent the timing circuit from obtaining a time value accurately related to the velocity of the adjacent earth formations or other media.

Heretofore, the housing or support means provided for supporting and spacing the transducers from one another have had low strength characteristics and either (1) a low velocity characteristic, or (2) the support means have had an attenuating characteristic to suppress the amplitude of the energy. In other words, the support means heretofore have acoustically inhibited detectable acoustic energy from triggering a transducer prior to the earliest arrival of the acoustic energy traveling through earth formations. However, to meet these acoustical inhibiting conditions for acoustically blocking the direct sound path, the support means have been complex and expensive to manufacture and have been expensive to maintain and have been lacking in strength qualities for repeated, general field use.

Accordingly, it is an object of the present invention to provide new and improved acoustic logging tools wherein the support has high strength qualities as well as an acoustical inhibition characteristic relative to the transmission of detectable acoustic energy lengthwise of the support between transducers.

A further object of the present invention is to provide new and improved acoustic logging tools having a relatively high strength and stiffness to withstand the shocks and forces inherently encountered in a logging operation.

Another object of the present invention is to provide acoustic logging tools with a support strong in tension to facilitate a fishing or retrieving operation if the tool should become temporarily immovable in the well bore.

Still another object of the present invention is to provide new and improved acoustic logging tools having a high strength, unitary and integral support constructed and arranged for artifically increasing the normal time interval required for an acoustic pulse to pass therethrough.

A still further object of the present invention is to provide a new and improved support for acoustic logging tools which is constructed of metal with a configuration such that the support has a lower velocity characteristic than normally would be expected.

Yet another object of the present invention is to provide a new and improved support for acoustic logging tools in accordance with the foregoing objects which is relatively inexpensive to manufacture and is durable and reliable in field operations.

Apparatus in accordance with the present invention includes an elongated, relatively stiff, high-strength metallic tubular member for carrying at least two acoustic transducers in a spaced apart relation. The generally tubular configuration of the member is characterized by void or open spaces arranged in a pattern about the periphery of the tubular member and along its length. The pattern arrangement is such that successive pairs of points spaced along generatrices of said members are joined by solid portions of the member to form an acoustic path which (1) is substantially longer in distance than the straight line distance along a generatrix between such successive pairs of points, or (2) provides a substantial acoustic attenuation due to the constantly varying shape and size of the acoustic path, or (3) both of items (1) and (2) above.

The novel features of the present invention are set forth with particularity in the appended claims. The present invention, both as to its organization and manner of operation, together with further objects and advantages thereof, may best be understood by way of illustration and example of certain embodiments when taken in conjunction with the accompanying drawings in which:

FIG. 1 is a view of an acoustic logging tool embodying the present invention;

FIG. 1A is an electrical schematic diagram of an operating system for the acoustic logging tool, shown in FIG. 1;

FIG. 2 is an enlarged view in longitudinal cross-section taken along line 2—2 of FIG. 1;

FIG. 3 is an enlarged view of a portion of the tool shown in FIG. 1 and illustrating the section of the tool adjacent to a transducer;

FIGS. 4 and 5 are views in cross-section taken along line 4—4 and line 5—5, respectively, of FIG. 3;

FIG. 6 is a view of the outer cylindrical surface of a portion of the tool shown in FIG. 1 developed in the plane of the drawing;

FIGS. 7 and 8 are views of outer cylindrical surfaces developed in the plane of the drawing and illustrating other embodiments that the configuration of the tool may take;

FIG. 9 is a view of a portion of a tool embodying still another configuration of the present invention;

FIG. 10 is a view of the tool shown in FIG. 9 developed in the plane of the drawing;

FIG. 11 is a view in cross-section taken along line 11—11 of FIG. 9;

FIG. 12 is a view of an outer surface of a portion of a tool embodying another configuration of the present invention;

FIG. 13 is a view of the section of the tool shown in FIG. 12 developed in the plane of the drawing;

FIG. 14 is a view of an outer surface of a portion of a tool embodying another configuration of the present invention;

FIG. 15 is a view of the section of the tool shown in FIG. 14 developed in the plane of the drawing;

FIG. 16 is a view of an outer surface of a portion of a tool embodying another configuration of the present invention;

FIG. 17 is a view of the section of the tool shown in FIG. 16 developed in the plane of the drawing;

FIG. 18 is a view of an outer surface of a portion of a tool embodying another configuration of the invention;

FIG. 19 is a view of the section of the tool shown in FIG. 18 developed in the plane of the drawing;

FIG. 20 is a view in cross-section taken along line 20—20 of FIG. 18;

FIG. 21 is a view of an outer surface of a portion of a tool embodying another configuration of the present invention;

FIG. 22 is a view in cross-section taken along line 22—22 of FIG. 21;

FIG. 23 is a view of an outer surface of a portion of a tool embodying another configuration of the present invention; and FIG. 24 is a view in cross-section of another mounting system for the transducers of the tool illustrated in FIG. 1.

In the description to follow, it should be understood that the term "acoustic energy" refers primarily to compressional wave energy although it is not intended to exclude acoustic energy such as shear wave energy, etc. Likewise the term "characteristic velocity" as hereinafter used means the velocity value normally obtained when a pulse of acoustic energy traverses a solid, uninterrupted material object in a straight line path between two fixed points in a given time. The term "detectable" energy or "detectable" acoustic energy as used hereinafter means acoustic energy having a characteristic which is capable of energizing a transducer such that a detecting circuit is responsive to the electrical signal generated in response to the characteristic of the acoustic energy. "Apparent velocity," as hereinafter used, means an apparent velocity value normally obtained when a pulse of detectable acoustic energy traverses a material object, constructed and arranged in accordance with the present invention, between two fixed points lengthwise of the object over a time interval other than would be normally expected for the object in its solid configuration. The term "acoustic path" as hereinafter used means solid, substantially continuously connected material providing a medium through which acoustic wave motion may be transmitted.

The present invention is concerned with an acoustic logging tool having an elongated, tubular support constructed of steel for strength and ruggedness. Since the characteristic velocity of acoustic energy in steel is in the neighborhood of 17,000 feet per second and the range of characteristic velocities of the earth formations or media desired to be investigated is from 5,000 to 25,000 feet per second, it will be appreciated why a steel support or housing has heretofore been considered unusable.

Considering first the fact that the characteristic velocity, distance and time factors are related by the classical expression $S = vt$ so that from two given values, the third may be reliably calculated, it will be appreciated that for a fixed length of housing, the time factor is inversely related to the velocity factor. Therefore, it would appear that acoustic energy traveling over a fixed length of steel housing which has a characteristic velocity of 17,000 feet per second, would invariably travel over the fixed distance in a fixed time. However, by means of the present invention, the construction of the steel housing can be arranged so that detectable energy travels over a fixed length of housing with an apparent velocity which is considerably less than 17,000 feet per second and in a time interval which is greater than the aforesaid fixed time. In fact, the apparent velocity of a steel housing may be made substantially equal to or less than the characteristic velocity of the fluids in the well bore.

In accordance with the present invention, prime conditions for reducing the characteristic velocity of a length of a tubular support constructed of steel are to substantially eliminate any direct linear path longitudinally of the tubular support and to provide an acoustic interference pattern lengthwise of the housing. Stated another way, the linear continuity of the tubular support in its lengthwise direction is substantially interrupted or disrupted, and by so doing, tortuous acoustic paths are formed. However, the interruption is such that there are remaining longitudinal interconnecting ties which prevent substantial longitudinal flexing of the tubular member. This effectively lengthens the path that acoustic energy must follow and also affects the mechanical characteristics of a support by decreasing the longitudinal unit spring rate of the support and the weight per unit length.

The present invention has three categories which are embodied in an acoustic logging tool having an integral tubular support member constructed in accordance with the principles to be described hereinafter.

In the first category of the invention, and the preferred embodiment, an integral tubular member or support is provided which has a low velocity characteristic i.e., 5,000–6,000 feet per second obtained by void spaces in the member arranged to provide a relatively long acoustic path and a relatively low unit spring rate relative to the mass of the member.

In the second category of the present invention an integral tubular member or support has a medium velocity characteristic, i.e., 10,000–11,000 feet per second obtained by void spaces in the member arranged to provide a relatively long acoustic path and interference to acoustic energy in the acoustic path to attenuate the acoustic energy. Because of the arrangement and character of the void spaces, only a medium unit spring rate relative to the mass of the member is obtained.

In the third category of the present invention an integral tubular member or support has a moderately high velocity characteristic, i.e., 12,500 feet per second, obtained by void spaces in the member arranged to provide a relatively high unit spring rate and substantial interference in the acoustic path to attenuate the acoustic energy.

As will now be explained, a derived relationship between the unit spring rate and weight per unit length can give a fair approximation of the "apparent velocity" of a tubular number constructed and arranged in accordance with the present invention wherein the "apparent velocity" is substantially independent of a specific configuration of the tubular member.

From basic physics, it is known that the velocity V in elongated bars and tubes is equal to $$V = \sqrt{\frac{E}{\rho}} \qquad (1)$$

where $E$ is Young's modulus of elasticity and $\rho$ is the mass density. It is also known that the weight density $d$ is equal to $$d = \rho g \qquad (2)$$

where $g$ is the gravitational constant of 32.2 pounds per sec.$^2$. Young's modulus of elasticity $E$ is, of course, equal to $$E = \frac{Pl}{A(\Delta)l} \qquad (3)$$

where P is a force in pounds; $l$ is a length in inches; A is a cross-sectional area in square inches; and $\Delta l$ is a change in length in inches.

Substituting Equations 2 and 3 into Equation 1 and adjusting the units into inches and pounds gives the following equation for velocity $$V = \sqrt{P \frac{(l)}{(\Delta l)} \frac{(l)}{(W)} \frac{(g)}{(12)}} \qquad (4)$$

Equation 4 can be rearranged as follows:

$$V = \frac{\sqrt{\frac{g}{(12)} \frac{(P)}{(\Delta l/l)}}}{W/l} = 1.639 \sqrt{\frac{S}{w}} \qquad (5)$$

where V is velocity in feet per second and where $s$ is the unit spring rate in pounds/in./in., W equals the weight in pounds, and $w$ equals the weight per unit length in pounds/in.

From Equation 5, the velocity may also be expressed as follows:

$$V = \frac{\sqrt{\frac{g}{12} \cdot s}}{w} \qquad (6)$$

where $s$ is the unit spring rate. Substituting the right hand term of Equation 6 for the velocity in the basic relationship, $S=Vt$, and rearranging terms, the travel time $t$ of acoustic energy is related to the distance and the spring rate as follows:

$$t = \frac{S}{\sqrt{\frac{gs}{12w}}} \qquad (7)$$

The above derived relationships are considered applicable for deriving approximate apparent velocity or travel time values for a tubular member with void spaces arranged about its periphery and along its length in such a manner that a substantially non-linear or interrupted acoustic path is provided lengthwise of the housing. The apparent velocity derived from the use of the formula of Equation 5 is also understood to be the limiting value of velocity which would be obtained as the frequency of the acoustic energy approaches zero.

The precise theoretical effect of frequency of the pulse of energy relative to the above derived relationship has not been exactly determined. However, the following effects have been observed. A predominant frequency value for a pulse of energy from a given transmitter can be shown to be the resonant frequency of the transmitter and can be easily determined by measurement of the time period of a cycle. It should be appreciated that a pulse of energy from a transmitter is generally made up of a multitude of frequencies above and below that of the predominant frequency. The intensity of the frequency components is generally a maximum at the predominant frequency and decreases for frequencies above and below the predominant frequency.

The ability of a tubular member to pass sound will depend upon the following:

(1) Acoustic path length.
(2) Attenuation tendency or inhibition characteristic.
(3) Spring rate and mass per unit length.

Disregarding pass bands and other frequency sensitive phenomena, it can be generally stated that the maximum velocity will be determined by the interconnected path length. For a given path width, sound frequencies with a quarter-wave length less than the path width are permitted to pass with relatively low resistance. As the frequency is decreased, the quarter-wave length is increased and the resistance to passage increased, causing a reduction in signal intensity. This is accompanied also by a decrease in the speed of transmission. As the frequency continues to decrease, the resistance to passage increases and the speed of propagation decreases until the limiting value based on the unit spring rate and mass per unit length is reached. From this it can be seen that the apparent detectable velocity will fall somewhere between the values obtained by unit spring rate-mass determination and by a determination of the length of the acoustic path, depending upon the frequency distributed of the acoustic pulse. As would be expected, with a steel tubular member constructed and arranged to have a given apparent velocity calculated by means of the previously derived relationship, a pulse of energy with, for example, a predominant frequency of 30 kc. generally travels through the housing with an actual apparent velocity which is higher than a calculated apparent velocity derived from the unit spring rate and weight per unit length.

Turning now to specific illustrations of the present invention, it should be understood that the present invention involves an elongated and generally cylindrical well tool which is to be used in a well bore containing a well fluid. The tool is adapted to be passed through the well bore by means of an armored electrical cable spooled on a surface-located winch and is electrically coupled to surface indicating and recording units.

As stated heretofore, the first category of the present invention involves an acoustic logging tool with a housing having a relatively long acoustic path and a low unit spring rate with respect to the mass of the housing. FIGS. 1–12 relate to this category of the invention.

In FIG. 1 there is illustrated an elongated but rigidly constructed acoustic logging tool 20 adapted for passage in the above described customary manner through a well bore (not shown) by means of an armored electrical cable 21 and winch (not shown) which is situated at the earth's surface. The tool 20 includes an upper, tubular cartridge or housing 22 and a lower, tubular housing 23, both of which are preferably constructed of steel. A single centralizer support device 24 disposed at the center of gravity of the tool 20 may be employed if the tool is to be centered in a well bore. Alternatively, two or more centralized support disposed along the length of the tool may be employed if so desired. Also, if desired, a caliper device 25 for measuring the diameter of the well bore may be coupled to the tool 20, for example, at its lower end as shown in the drawing.

Within the upper cartridge 22 are electronic components and circuits to periodically actuate the transmitter T and to perform the measuring function in response to signals from the receivers $R_1$ and $R_2$. The electronic circuits are coupled via cable 21 to conventional surface indicating and recorder instruments (not shown). Briefly, the measuring function may be accomplished by circuits as shown in FIG. 1A wherein a keying circuit 26 periodically triggers the transmitter T to emit a pulse of acoustic energy. The keying circuit also conditions a pulse generator 27 for operation after a predetermined time interval which is fixed by a delay gate 26'. The predetermined time interval is, of course less than the time required for an emitted pulse of acoustic energy to reach the receiver $R_1$. The keying circuit also provides a reset pulse to reset a time to voltage circuit 26a. At the time the first receiver $R_1$ senses the acoustic energy emitted by the transmitter T, a characteristic of the electrical signal developed by the receiver $R_1$ is used to trigger the pulse generator 27 to produce an output pulse. The output pulse of generator 27 triggers a multivibrator 28 into operation and also operatively conditions a pulse generator 27a for operation by means of a gate circuit 27''. Thereafter the acoustic pulse arriving at receiver $R_2$ similarly triggers the pulse generator 27a to produce an output pulse which triggers the multivibrator 28 into an inoperative condition. The time interval $\Delta t$ between the output pulses of the pulse generators 27 and 27a is converted by a time to voltage circuit 26a into a voltage signal for transmission to the surface instruments via the cable 21.

The lower, tubular housing 23 includes three illustrative and similarly formed transducer sections identified by the number 30 and differentiated from one another by the letters a, b and c. Transducer sections 30 may be separated from one another by identically formed acoustic inhibiting sections identified by the number 31 and differentiated from one another by the letters a and b. In general, each transducer section 30 is constructed and arranged to permit and to facilitate the travel of acoustic energy in a generally radial pattern between a transducer within the tubular housing and the fluids or muds (not shown) in the well bore which are exterior of the tubular housing. Also, in general, each acoustic inhibiting section 31 is constructed and arranged so as to increase the apparent time required for detectable energy to travel over the portions of the housing between transducer sections 30.

As schematically shown in FIG. 2, exemplary magnetostrictive transducers 35 and 35a can be secured in any convenient manner to a tubular support rod 34 having a low velocity characteristic. For example, rod 34 can be constructed of "Teflon," which has a characteristic velocity of 4400 feet per second. While not shown, the electrical conductors for the exemplary transducers 35 and 35a may be passed through openings (not shown) in rod 34 to the electronic cartridge housing 22. Transducers 35 and 35a are conventional in the art and need not be further described. The support rod 34 can be connected (not shown) in any suitable and convenient manner relative to the lower housing 23 so that the transducers 35 and 35a are disposed in a generally central position relative to the cross section of the lower housing 23 and generally in a central position relative to the length of a transducer section 30. Alternatively, the transducers could be directly attached to the interior of the housing in any suitable manner if so desired.

A transducer section 30, as illustrated in FIGS. 2–4, comprises a plurality of openings 36 in the housing 23, which are generally rectangularly shaped lengthwise of the housing and are equidistantly spaced from one another about the periphery of the housing. The width of an opening 36 is defined between parallel and longitudinally extending side surfaces 36a, 36b, (FIGS. 3, 4) and, is generally equal to the width of the sections or portions 37 of housing disposed between adjacent openings 36. The length of an opening 36 is defined between upper and lower inside end surfaces 36c, 36d, (FIGS. 2–3) which slope inwardly towards one another from the outer surface of the housing 23 to its inner surface. The length of the openings 36 generally should be equal to or greater than the longitudinal dimension of a transducer 35 within the housing. Since a typical magnetostrictive transducer has an appreciable longitudinal dimension (2" to 3" in a typical instrument) the openings 36 are illustrated as elongated in a direction lengthwise of the housing. The sections 37 of the housing between the openings 36 provide excellent stress bearing qualities. Preferably, there are from 8 to 12 such openings 36 spaced about the periphery of the housing for a magnetostrictive transducer which emits primarily radial pressure waves. This range of openings has been found to provide an efficiency of transmission of sound radially from or into the housing, which ranges from 98% to virtually 100%.

Each acoustic inhibiting section 31 is constructed and arranged to provide void spaces about the periphery and along the length of the housing 23 which form a generally tortuous configuration. Hence, acoustic wave transmission lengthwise of the housing occurs by traveling tortuous paths which extend between successive points spaced along a generatrix of the lower housing 23 and which are greater than the straight line distance between a successive pair of points. More specifically, as shown in FIGS. 2, 3, 5 and 6, an acoustic inhibiting section 31 exhibits a characteristic pattern which prevails over a length of the lower housing between adjacent transducer sections 30. The preferred pattern as illustrated, consists of a first group 40 and a second group 50 of slots or openings in the housing 23 which alternate along the length of the housing. The groups (40 and 50) of slots are separated from one another by annular, solid sections or portions 45 of the housing. A typical first group 40 of slots is comprised of three openings or slots 41, 42 and 43 (FIGS. 5–6) which are somewhat rectangular in form with their elongated open section lying in a plane perpendicular to the central axis of the housing. The openings or slots 41, 42 and 43 are equidistantly spaced from one another by short sections or portions 41a, 42a and 43a of the housing. As a measure of proportions about the central axis of the housing, each slot is open for approximately 90° while each short section extends for approximately 30° (see FIG. 5).

A typical second group 50 of slots is comprised of three openings or slots 51, 52 and 53 (FIG. 6) which are similarly rectangular in form with their elongated open section also lying in a plane perpendicular to the central axis of the housing. The openings or slots 51, 52 and 53 similarly are equidistantly spaced from one another by short spacing sections or portions 51a, 52a and 53a of the housing.

To provide the interrupted linear path lengthwise of the housing, adjacent groups 40 and 50 of slots are displaced or disposed angularly relative to one another so that the short spacing sections (41a, 42a, 43a, or 51a, 52a, 53a) of the housing are positioned intermediate of the mid-portions of the elongated open sections of the slots of the adjacent slot group. Hence, there is no straight-line path of interconnected material extending lengthwise or longitudinally of the housing, rather, the acoustic path longitudinally of the housing is a tortuous one and longer than a straight line path extending longitudinally of the housing.

The spacing between the planes upon which groups (40 and 50) of slots are disposed as well as the width of the annular solid sections 45 preferably should be fairly uniform and should be a dimension which is a quarter wave length or less than the predominant frequency of the pulse of energy. In this manner, the predominant frequency signal in a pulse of energy which travels the tortuous path is greatly attenuated. The higher frequencies in the predominant signal are of small initial intensity and do not produce any detectable acoustic energy in the receivers. The lower frequencies are also of small initial intensity and are delayed by the unit spring rate of the housing. The width and length of individual slots in the groups 40 and 50 may obviously be varied. However, it will be appreciated that the unit spring rate and weight per unit length are dependent upon the size of the slots so that slot size is related to the apparent velocity that the housing will have. While it is appreciated that acoustic energy may possibly travel in a straight line path along the housing by jumping from segment to segment, such energy is so greatly attenuated by the transfer between interrupted areas that it is negligible for detection purposes at a receiver.

The following practical examples are given of the above configuration.

*Example No. 1 (FIGS. 1–6)*

A sample metal tube was constructed having a pattern as shown in FIGS. 1–6 wherein the slots were milled in the tubular housing by means of a 6″ diameter cutter with a ¼″ width, with the center axis of the cutter spaced 4″ from the center axis of the tubular housing. There was 1″ spacing between the planes of the slot groups. The slot openings made up 17½% of the sample.

The material for the tubular housing was steel, AISE 4140, heat treated to 125,000 p.s.i. minimum yield strength and of the following dimensions: 3⅝″ O.D. x 2⅝″ I.D.

The effective length of the test housing was 9.25″. The test housing was subjected to the following mechanical tests without failure.

Tension—100,000 pounds axial load
Compression—92,000 pounds axial load
Bending—6,000 ft. pounds bending moment The incremental change in length was .0034″ per 4,000# load during the tensile test. The weight of the housing was calculated to be 1.192 pounds/in. of length. The unit spring rate is $10.88 \times 10^6$ pounds/in./in.

From the above parameters, the computed apparent velocity according to Formula 5 is 5060 ft./sec. Using a 30 kc. pulse of acoustic energy, the actual measured apparent velocity for the test housing was about 5200 ft./sec.

*Example No. 2 (FIGS. 1–6)*

Another test housing was made as above except that the spacing between the planes of the slot groups was shortened to ⅞″. In this case the slot openings made up 20% of the sample. The effective length of the housing was 10.8″.

This test housing was subjected to a tension force of 4,000 pounds and changed in length 0.0059″. The weight of the housing was calculated to be 1.106 pounds/in. The unit spring rate is $7.33 \times 10^6$ pounds/in./in. The test housing was subjected to the following mechanical tests without failures.

Tension—92,000 pounds axial load
Compression—92,000 pounds axial load
Bending—5,000 ft. pounds bending moment The incremental change in length was 0.0059″ per 4,000 pound load during the tensile test.

From the above parameters, the computed apparent velocity according to Equation 5 is 4210 ft./sec.

Using a 30 kc. pulse of acoustic energy, actual measured apparent velocity was 5070 ft./sec.

As shown by the examples in FIGS. 7–12, an acoustic inhibiting section may have other patterns without departing from the scope and principles of the invention. In FIG. 7, for example, the pattern (illustrated for simplicity as developed in the plane of the drawings) includes a plurality of elongated, identically shaped triangular slots 61 arranged in a first group 60 so that the base surfaces 61a of such triangular slots 61 are disposed in a common plane which is perpendicular to the central axis of the housing. The apices 61b of the triangular slots 60 lie to one side of the base surfaces 61a and towards one end of the housing. The end corners of the triangular slots 61 common to the base surfaces 61a are equidistantly spaced from one another about the periphery of the housing by short sections or portions 62 of the housing.

Adjacent to the first group 60 of slots 61 are a plurality of elongated triangularly shaped slots 71 in the housing which are arranged in a second group 70 and in an inverted relation to the first group 60 of slots. Slots 71 of the second group 70 likewise respectively have base surfaces 71a which are disposed in a plane perpendicular to the central axis of the housing while the apices 71b of the slots lie to one side of the base surfaces 71a and are towards an opposite end of the housing. The end corners of the triangular slots 71 common to the base 71a are equidistantly spaced from one another about the periphery of the housing by short sections or portions 72 of the housing.

Each of the aforesaid groups 60 and 70 is similar having three individual slots to a group. Also, the slots of one group 60 are displaced in alternate intermeshing relation so that the connecting housing portions 73 between adjacent inclined slot surfaces of adjacent inverted slots are disposed at an angle relative to the perpendicular planes for the slots yet are offset so as not to form any continuous helical paths.

The pair of groups 60 and 70 of slots above described are repeated in the pattern along the length of the housing. Between each pair of inverted triangular slot groups 60 and 70 is a solid annular section 74 of the housing. The slots of groups 60 and 70 disposed to either side of the annular section 74 are aligned respectively with one another so that the short sections 62 and 72 spacing corners of adjacent slots from one another are aligned. It will be appreciated that with the pattern illustrated in FIG. 7, there is no direct straight-line metallic path extending longitudinally for the length of the housing but, rather, the path is a tortuous one.

In FIG. 8 a pattern similar to the pattern illustrated in

FIG. 7 is disclosed wherein groups 60 and 70 of triangularly shaped slots are inverted relative to one another and disposed about the periphery of the housing in an alternate intermeshing relation to form inclined connecting portions 73' of the housing. However, in this pattern the groups 60 and 70 of slots are respectively aligned relative to one another lengthwise of the housing. In this manner, short sections of housing between the corners of the slots of one group are always positioned intermediate of the base surfaces of the slots in an adjacent slot group. Hence, the path longitudinally of the housing is lengthened.

In FIGS. 9-11, another pattern similar to the pattern illustrated in FIG. 7 is disclosed. As shown in FIGS. 9-11 a tubular housing has a number of alternating slot groups 80 and 90 spaced along its length. Slot group 80 preferably includes three generally diamond shaped slots 80a, 80b and 80c (FIG. 11) equidistantly disposed about the housing and spaced from one another by short sections 80d of the housing. The slots 80a, 80b, and 80c are preferably elongated with rounded corners and their major axis lying in a plane perpendicular to the central axis of the housing.

Slot group 90 similarly includes three diamond shaped slots 90a, 90b and 90c (FIG. 10) equidistantly disposed about the housing and spaced from one another by short sections 90d of the housing. Slots 90a, 90b and 90c are likewise elongated extend in a plane perpendicular to the central axis of the housing. The slot groups 80 and 90 are circumferentially displaced relative to one another and longitudinally spaced from one another to intermesh such that angular connecting portions 81 (FIG. 10) are formed and the short sections of housing between the slots of one group are positioned intermediate of mid-portions of the slots of the adjacent slot group. In this manner, the metallic path longitudinally of the housing is lengthened.

The following practical example of the configuration of FIGS. 9-11 is given:

*Example No. 3 (FIGS. 9-11)*

A sample metal tube was constructed having a pattern as shown in FIGS. 9-11. The window openings were sized to make up about 48% of the sample.

The apparent velocity of the sample was calculated from Equation 5 from a test sample having the following parameters:

Pipe size: 3.62 O.D x 2.77" I.D.
Material: Steel—AISI 4130
Heat treat: 30-35 R "C" 125,000 p.s.i. minimum yield
Effective length: 6.75"
Weight: 4.5 pounds The test housing was subjected to axial loads to determine its strength. The incremental change in length was .0082 in. per 5,000 pound load. Yielding occurred at 27,000 pounds of axial load.

From these parameters and Equation 5 the apparent velocity is calculated to be 4130 ft./sec.

An acoustic test of this sample using a 30 kc. pulse of acoustic energy gave an actual measured apparent velocity of 4700.

The second category of the present invention which involves a relatively long acoustic path and a medium spring rate is illustrated in FIGS. 12-20.

As shown in FIGS. 12-13, the pattern of an acoustic inhibiting section can be modified in a somewhat different manner than the previously described patterns. The pattern which prevails over the length of the housing between transducer sections and as illustrated in FIGS. 12-13 consists of groups 95 and 100 of cylindrical openings which alternate along the length of the housing. A first set or group 95 of openings includes eight openings 95a, which are equidistantly spaced from one another about the periphery of the housings and respectively have their centers lying in a plane perpendicular to the central axis of the housing. Generally, a section 96 of the housing between adjacent openings along the perpendicular plane should be approximately equal to the diameter of an opening 95a. The second group 100 of openings similarly includes eight openings 100a which are equidistantly disposed about the periphery of the housing and have their centers lying in a plane perpendicular to the central axis of the housing. To interrupt the linear acoustic path lengthwise of the housing, the second group 100 of openings is displaced angularly relative to a first group 95 of openings and has portions thereof disposed intermediate the space between openings in group 95 so that only thin interconnecting angularly disposed portions 97 (FIG. 13) of the housing remain which provide a lengthened acoustic path longitudinally of the housing.

The following practical example of the above pattern is provided.

*Example No. 3 (FIGS. 12-13)*

A sample metal tube was constructed having a pattern as shown in FIGS. 12 and 13 wherein eight holes per group were provided and the spacing between adjacent groups was one inch. The holes had a one inch diameter. The openings made up 60% of the sample.

The material for the tubular housing was steel AISI 4140, heat treated to 125,000 p.s.i. minimum yield with the following dimensions: 4" O.D. x 3" I.D. x 48" length.

A test housing was tested to 92,000 pounds of axial load and 6,000 pounds bending moment.

The apparent velocity measured for a 30 kc. signal was 10,400 ft./sec.

*Example No. 4 (FIGS. 12-13)*

With a similar sample tube as described in Example No. 3, six holes per group were provided with an average diameter of 1 3/16 inches.

The apparent velocity measured for a 30 kc. signal was 10,300 ft./sec.

Referring now to FIGS. 14 and 15 a pattern similar to that described in connection with FIGS. 12 and 13 is disclosed. In this pattern, the circular openings 110a in one group 110 have twice as large a diameter as the diameter of the circular openings 115a of the second group 115. Only six openings about the periphery of the housing are provided in each of the groups 110 and 115. The portions of the housing which equidistantly space the larger openings 110 from one another are substantially equal to the diameter of the smaller openings 115 while the portions of the housing which equidistantly space the smaller openings 115 from one another are substantially equal to the diameter of the larger openings 110 (a-c). The axes of the larger openings of groups 110 are displaced at an angle of 30° from the axes of the smaller openings of the groups 115. The longitudinal displacement between adjacent planes on which the centers of the openings of the respective groups lie is substantially equal the sum of the radii of a large and a small opening.

A practical example of the foregoing arrangement is given as follows:

*Example No. 5 (FIGS. 14-15)*

A sample metal tube was constructed having a pattern as shown in FIGS. 14-15 wherein six holes per group were provided and the spacing between groups was 1 1/16" on centers. The diameter of the larger openings 110a was 1½" and the diameter of the smaller openings 115a was ¾". The openings made up 60% of the sample.

The material for the tubular housing was steel AISI 4140, heat treated to 125,000 p.s.i. minimum yield with the following dimensions: 4" O.D. x 3" I.D. x 48" length.

The test housing was tested to 112,000 pounds of axial load and 5,000 pounds bending moment.

The apparent velocity measured for a 30 kc. signal was 10,600 ft./sec.

In FIGS. 16 and 17 still another configuration is illustrated wherein a group 120 of openings on a plane perpendicular to the longitudinal axis of the housing includes a plurality of pairs of adjacent openings 120a and 120b wherein the pairs of openings are spaced from one another about the periphery of the housing by short sections 121 of the housing. Each of the openings in a pair have central axes which respectively intersect the central longitudinal axis of the housing and the spacing between adjacent openings 120a and 120b is less than the spacing between pairs, such that there is relatively little metal extending longitudinally in a direct line between adjacent openings of a pair. The short sections 121 of housing separating adjacent pairs of openings is approximately equal to one half the diameter of an opening.

The group 120 of openings is repeated along the length of the housing but at different angular orientations relative to the periphery of the housing. The different angular orientation may be random or randomly systematic to disrupt the direct acoustic path lengthwise of the housing.

A practical example of the foregoing arrangement is given as follows:

*Example No. 6 (FIGS. 16-17)*

A sample metal tube was constructed having a pattern as shown in FIGS. 16-17 wherein ten holes per group were provided and the spacing between groups was one inch. The diameter of the holes was $19/32$ inch. The openings made up 20% of the original volume of metal.

The material for the tubular housing was steel AISI 4140, heat treated to 125,000 pounds minimum yield with the following dimensions: 4" O.D. x 3.06" I.D.

The apparent velocity measured for a 30 kc. signal was 12,700 ft./sec.

In FIGS. 18-20 another configuration of circular openings is illustrated. In this configuration, a group 130 of openings in a plane perpendicular to the central axis of the housing includes pairs of closely spaced circular openings wherein the pairs of openings are equidistantly spaced by short longitudinal sections of the housing from other pairs of closely spaced openings about the periphery of the housing. The close spacing between the openings in a pair of openings is such that the small longitudinal portion of the housing separating a pair of openings does not provide any significant acoustic path. The circumferential width for each short section of the housing is made less than the circumferential dimension across a pair of openings. Hence, by angularly displacing the pairs of openings of one group alternately relative to the pairs of openings in adjacent groups and separating each group from one another by a short annular section of the housing, the housing presents a substantially tortuous path for acoustic energy.

A practical example of the foregoing arrangement is given as follows:

*Example No. 7 (FIGS. 18-20)*

A sample metal tube was constructed having a pattern as shown in FIGS. 18-20 wherein ten holes per group or station are provided and the spacing between groups is one inch. The diameter of the holes was $19/32$ inch. The openings made up 28% of the volume.

The material for the tubular housing was steel AISI 4140, heat treated to 125,000 p.s.i. minimum yield and with the following dimensions: 4" O.D. x 3" I.D.

The apparent velocity measured for a 30 kc. signal was 12,000 ft./sec.

The third concept of the present invention is best illustrated by reference to FIGS. 21 and 22.

In FIG. 21, the configuration illustrated involves a tubular housing 140 which has inner and outer spiralling U shaped grooves 141 and 142. Each of the grooves spirals in a similar manner and has the same pitch. The grooves are, however, displaced at 180° relative to one another when viewed from a horizontal cross-section as in FIG. 22. The depth of the grooves 141 and 142 is such that the lowest portion of each groove extends beyond a mid-point between the inner and outer walls of the housing 140. In this manner, a linear path lengthwise of the housing is interrupted. The spacing between the inner and outer grooves lengthwise of the housing is made less than one quarter wave length of the principal frequency of the acoustic energy. The pitch of the grooves is made such that energy traveling in a helical path through the solid portion separating the grooves will be delayed by the extra path length created.

*Example No. 8 (FIG. 21)*

A sample metal tube was constructed having a pattern as shown in FIG. 21.

To calculate the velocity, the following parameters were employed:

Pipe size: 3.62" O.D. x 2.77" I.D.
Material: Steel—AISI 4130
Heat treat: 25-35 R "C"

The grooves were right hand spirals with 1.38" lead with the inner groove spaced 180° from the outer groove when viewed from a horizontal cross-section. The groove dimensions were: depth=.25"; width at outer surface=$7/8$"; inward taper of groove=150° from perpendicular to central axis for each side of groove.

Effective length—11"
Weight—11.5 pounds
Gravitational constant—32.2 ft./sec.$^2$
Compressional force—20,000 pounds
Change in length, $\Delta l$—.0076 in.

The computed velocity is 8620 ft./sec.
The actual measured velocity using a 30 kc. pulse of acoustic energy was 12,100 ft./sec.

In FIG. 23 the shape of the outer groove 142' of the modified housing 140' is enlarged relative to the groove 142 shown in FIG. 21 so that it is considerably wider than the inner groove 141 and rectangular in form. The depth of the grooves 141 and 142' remain substantially the same, in that the inner and outer grooves overlap the mid-point between the inner and outer walls of the housing.

To provide illustrations of the nature of the above configuration, the following listed example is provided:

*Example No. 9 (FIG. 23)*

A sample metal tube was constructed having a pattern as shown in FIG. 23. This pattern involved the provision of an outer groove with a width of 0.6" and wherein the sides of the groove were generated by radii from the axis of the tube. Other parameters are:

Effective length—11"
Weight—9.38 pounds
Gravitational constant—32.2 ft./sec.$^2$
Compressional force—20,000
Change in length, $\Delta l$—.0077"

The computed velocity is 9480 ft./sec.
The actual measured velocity using a 30 kc. pulse of acoustic energy is 10,800 ft. per sec.

Referring now to FIG. 24, another form, which FIGS. 1-6 may assume is illustrated. The acoustic inhibiting section 31 remains the same however at the end of the section the housing is reduced in diameter to provide a hub 35' for transducer 35. It will be readily apparent that mounting of the transducers in this manner can easily be accomplished by one skilled in the art.

From the foregoing description of the present invention it will be appreciated how to provide an acoustic logging tool with a housing so constructed to substantially eliminate uniform longitudinal paths to inhibit the immediate transmission of detectable acoustic energy therealong.

It will be noted that the examples of housings illustrated in accordance with the present invention can have apparent velocity range from about 5000 to 12,000 feet per second. Obviously, lower or higher apparent velocity values can be obtained if desired and these examples are merely illustrative and should not be considered as a limitation. For open hole well bores, the lower apparent velocity arrangements are preferable to provide for a wide operating range. In cased well bores, the higher apparent velocity arrangements may be suitable since the steel casing is known to have a velocity of 17,000 feet per second.

In the disclosed arrangements, the transducers are so arranged that they are exposed to well fluids. However, if desired, the housing could be enclosed or plugged with a rubber or other low velocity composition to provide a fluid tight housing. In such an arrangement, the interior of the fluid tight housing would be oil-filled for sound transmission purposes.

While particular embodiments of the present invention have been shown and described, it is apparent that changes and modifications may be made without departing from this invention in its broader aspects and, therefore, the aim in the appended claims is to cover all such changes and modifications as fall within the true spirit and scope of this invention.

What is claimed is:

1. Apparatus for use in well bores comprising: an elongated, rigid tubular member; at least two acoustic transducers in a fixed, spaced relationship relative to one another along a section of said tubular member; the wall of said tubular member having a configuration between said acoustic transducers arranged to alter the time of arrival of detectable acoustic energy pulses traveling therethrough longitudinally of said tubular member, such configuration including interruptions in the longitudinal continuity of the wall of said tubular member to provide only tortuous alternative paths for passage of acoustic energy, which paths are longer than the longitudinal spacing between said transducers.

2. Apparatus for use in well bores comprising: an elongated, tubular member of steel, at least two acoustic magneto-strictive transducers in a fixed, spaced relationship relative to one another along a section of said tubular member; the wall of said tubular member having a configuration between said acoustic transducers arranged to delay the time of arrival of detectable acoustic energy pulses traveling therethrough longitudinally of said tubular member, such configuration including interruptions in the longitudinal continuity of the wall of said tubular member to provide only tortuous alternative paths for passage of acoustic energy which paths are longer than the longitudinal spacing between said transducers.

3. Apparatus for use in well bores comprising: an elongated, rigid, tubular member; at least two acoustic transducers in a fixed, spaced relationship relative to one another along a section of said tubular member; said tubular member having a configuration between said acoustic transducers arranged to alter the time of arrival of detectable acoustic energy pulses traveling longitudinally of said tubular member; such configuration including perforations along the length of said tubular member substantially interrupting the longitudinal continuity of said tubular member and providing only tortuous acoustic paths therethrough.

4. Apparatus for use in well bores comprising: an elongated, rigid, tubular member of steel; at least two acoustic, magneto-strictive transducers in a fixed, spaced relationship relative to one another along a section of said tubular member; said tubular member having a configuration between said acoustic transducers arranged to delay the time of arrival of detectable acoustic energy pulses traveling longitudinally of said tubular member; such configuration including perforations along the length of said tubular member substantially interrupting the longitudinal continuity of said tubular member and providing only tortuous acoustic paths therethrough.

5. Apparatus for use in well bores comprising: an elongated, rigid, tubular member of steel; at least two acoustic transducers in a fixed, spaced relationship relative to one another along a section of said tubular member; said tubular member having a configuration between said acoustic tranducers arranged to alter the time of arrival of detectable acoustic energy pulses traveling longitudinally of said tubular member; such configuration including circular perforations spaced from one another about the periphery of said member and along the length of said tubular member substantially interrupting the longitudinal continuity of said tubular member and providing only tortuous acoustic paths therethrough.

6. Apparatus for use in well bores comprising: an elongated, rigid, tubular member of steel; at least two acoustic transducers in a fixed, spaced relationship relative to one another along a section of said tubular member; said tubular member having a configuration between said acoustic tranducers arranged to alter the time of arrival of detectable acoustic energy pulses traveling longitudinally of said tubular member; such configuration including circular perforations spaced from one another about the periphery of said member and along the length of said tubular member in a symmetrical disposition and substantially interrupting the longitudinal continuity of said tubular member to provide only tortuous acoustic paths therethrough.

7. Apparatus for use in well bores comprising: an elongated, rigid, tubular member of steel; at least two acoustic transducers in a fixed, spaced relationship relative to one another along a section of said tubular member; said tubular member having a configuration between said acoustic tranducers arranged to alter the time of arrival of detectable acoustic energy pulses traveling longitudinally of said tubular member; such configuration including circular perforations of a given diameter spaced from one another about the periphery of said member and along the length of said tubular member substantially interrupting the longitudinal continuity of said tubular member and providing only tortuous acoustic paths therethrough.

8. Apparatus for use in well bores comprising: an elongated, rigid, tubular member of steel; at least two acoustic transducers in a fixed, spaced relationship relative to one another along a section of said tubular member; said tubular member having a configuration between said acoustic transducers arranged to alter the time of arrival of detachable acoustic energy pulses traveling longitudinally of said tubular member; such configuration including circular perforations spaced from one another about the periphery of said member and along the length of said tubular member substantially interrupting the longitudinal continuity of said tubular member, said perforations including sets of openings having different diameters alternating along the length of said tubular member to provide only tortuous acoustic paths therethrough.

9. Apparatus for use in well bores comprising: an elongated, rigid, tubular member of steel; at least two acoustic transducers in a fixed, spaced relationship relative to one another along a section of said tubular member; said tubular member having a configuration between said acoustic transducers arranged to alter the time of arrival of detectable acoustic energy pulses traveling longitudinally of said tubular member; such configuration including circular perforations spaced from one another about the periphery of said member and along the length of said tubular member substantially interrupting the longitudinal continuity of said tubular member, said perforations including sets of openings randomly disposed relative to one another along the length of said tubular member to provide only tortuous acoustic paths therethrough.

10. Apparatus for use in well bores comprising: an elongated, rigid, tubular member of steel; at least two acoustic transducers in a fixed, spaced relationship relative to one another along a section of said tubular member; said tubular member having a configuration between said acoustic transducers arranged to alter the time of arrival of detectable acoustic energy pulses traveling longitudinally of said tubular member; such configuration including oblong perforations spaced apart from one another about the periphery of said tubular member and along the length of said tubular member substantially interrupting the longitudinal continuity of said tubular member and providing only tortuous acoustic paths therethrough.

11. Apparatus for use in well bores comprising: an elongated, rigid, tubular member of steel; at least two acoustic transducers in a fixed, spaced relationship relative to one another along a section of said tubular member; said tubular member having a configuration between said acoustic transducers arranged to alter the time of arrival of detectable acoustic energy pulses traveling longitudinally of said tubular member; such configuration including oblong perforations spaced from one another about the periphery of said tubular member and along the length of said tubular member in a symmetrical disposition substantially interrupting the longitudinal continuity of said tubular member and providing only tortuous acoustic paths therethrough.

12. Apparatus for use in well bores comprising: an elongated, rigid, tubular member of steel; at least two acoustic transducers in a fixed, spaced relationship relative to one another along a section of said tubular member; said tubular member having a configuration between said acoustic transducers arranged to alter the time of arrival of detectable acoustic energy pulses traveling longitudinally of said tubular member; such configuration including triangulate perforations spaced from one another about the periphery of said tubular member and along the length of said tubular member substantially interrupting the longitudinal continuity of said tubular member, and providing only tortuous acoustic paths therethrough.

13. Apparatus for use in well bores comprising: an elongated, rigid, tubular member of steel; at least two acoustic transducers in a fixed, spaced relationship relative to one another along a section of said tubular member; said tubular member having a configuration between said acoustic transducers arranged to alter the time of arrival of detectable acoustic energy pulses traveling longitudinally of said tubular member; such configuration including perforations spaced from one another about the periphery of said tubular member and along the length of said tubular member substantially interrupting the longitudinal continuity of said tubular member, said perforations including sets of triangulated perforations alternated along the length of said tubular member to provide only tortuous acoustic paths therethrough.

14. Apparatus for use in well bores comprising: an elongated, rigid, tubular member of steel; at least two acoustic transducers in a fixed, spaced relationship relative to one another along a section of said tubular member; said tubular member having a configuration between said acoustic transducers arranged to alter the time of arrival of detectable acoustic energy pulses traveling longitudinally of said tubular member; such configuration including interruptions in the longitudinal continuity of said tubular member forming a series of interlinking metallic segments providing only tortuous paths for passage of acoustic energy which paths are longer than the longitudinal spacing between said transducers.

15. Apparatus for use in well bores comprising: an elongated, rigid, tubular member; at least two acoustic transducers in a fixed, spaced relationship relative to one another along a section of said tubular member; said tubular member having a configuration between said acoustic transducers arranged to alter the time of arrival of detectable acoustic energy pulses traveling longitudinally of said tubular member; such configuration including interruptions in the longitudinal continuity of said tubular member forming a series of interlinking metallic segments providing only tortuous alternative paths for passage of acoustic energy which paths are longer than the longitudinal spacing between said transducers.

16. Apparatus for use in well bores comprising: an elongated, rigid, tubular member of steel; at least two acoustic transducers carried in a fixed, spaced relationship relative to one another along a section of said tubular member; said tubular member having a configuration between said acoustic transducers arranged to alter the time of arrival of detectable acoustic energy pulses traveling longitudinally of said tubular member; such configuration including interruptions in the longitudinal continuity of said tubular member forming a series of interlinking metallic segments providing only tortuous paths for passage of acoustic energy which paths are longer than the longitudinal spacing between said transducers the width of such paths being a quarter wave length or less than the predetermined frequency of an acoustic signal traveling between said transducers.

17. Apparatus for use in well bores comprising: an elongated, rigid, tubular member of steel; at least two acoustic transducers carried in a fixed, spaced relationship relative to one another along a section of said tubular member; said tubular member having a configuration between said acoustic transducers arranged to alter the time of arrival of detectable acoustic energy pulses traveling longitudinally of said tubular member; such configuration including interruptions in the longitudinal continuity of said tubular member forming a series of interlinking metallic segments providing only tortuous paths for passage of acoustic energy which paths are longer than the longitudinal spacing between said transducers, the width of such paths being a quarter wave length or less than the predominant frequency of an acoustic signal traveling between said transducers, said interruptions serving to alter a relationship between the spring rate of said tubular member and the weight per unit of elongation so as to increase the transit time of detectable acoustic energy between said transducers while maintaining the rigidity of said tubular member with respect to bending moments.

18. Apparatus for use in well bores comprising: an elongated, rigid, tubular member of steel; at least two acoustic transducers carried in a fixed, spaced relationship relative to one another along a section of said tubular member; said tubular member having a configuration between said acoustic transducers arranged to alter the time of arrival of detectable acoustic energy pulses traveling longitudinally of said tubular member; such configuration including interruptions in the longitudinal continuity of said tubular member forming a series of interlinking metallic segments providing only tortuous paths for passage of acoustic energy which paths are longer than the longitudinal spacing between said transducers, the width of such paths being a quarter wave length or less than that of the predominant frequency of an acoustic signal traveling between said transducers, said interruptions serving to increase the travel time of detectable acoustic energy traveling between said transducers in accordance with the formula $$t = \frac{S}{\sqrt{\frac{gs}{12w}}}$$

where $t$ equals time S equals the distance between transducers, $g$ equals the gravitational constant, $s$ equals the unit spring rate and $w$ equals the weight per unit of length.

19. Apparatus for use in acoustically surveying a well bore comprising: an elongated, rigid, tubular member of steel adapted to be passed through a well bore by means of a cable; at least two acoustic transducers coupled to said support member in a fixed, spaced apart position, said tubular member between said transducers having diamond-shaped slots displaced relative to one another about the periphery and along the length of said tubular member so that the remaining portions of said tubular member providing only non-linear, acoustic paths longitudinally of said tubular member which are longer than the spacing between said transducers.

20. Apparatus for use in well bores comprising: an elongated, rigid, tubular member of steel; at least two acoustic transducers in a fixed, spaced relationship relative to one another along a section of said tubular member; said tubular member having a configuration between said acoustic transducers arranged to alter the time of arrival of detectable acoustic energy pulses traveling longitudinally of said tubular member; such configuration including interruptions in the longitudinal continuity of said tubular member to provide only tortuous alternative paths for passage of acoustic energy, said interruptions forming sets of slots, each set of slots including individual slots disposed about the circumference of said member, and each set of slots being uniformly spaced from one another along the length of said member.

21. Apparatus for use in well bores comprising: an elongated, rigid, tubular member of steel; at least two acoustic transducers in a fixed, spaced relationship relative to one another along a section of said tubular member; said tubular member having a configuration between said acoustic transducers arranged to alter the time of arrival of detectable acoustic energy pulses traveling longitudinally of said tubular member; such configuration including interruptions in the longitudinal continuity of said tubular member to provide only tortuous alternative paths for passage of acoustic energy, said interruptions forming sets of slots each set of slots including individual slots disposed about the circumference of said member, and each set of slots being uniformly spaced from one another along the length of said member, the width of said individual slots being less than the spacing between adjacent sets of slots.

22. Apparatus for use in well bores comprising: an elongated, rigid, tubular member of steel; at least two acoustic transducers in a fixed, spaced relationship relative to one another along a section of said tubular member; said tubular member having a configuration between said acoustic transducers arranged to alter the time of arrival of detectable acoustic energy pulses traveling longitudinally of said tubular member; such configuration including interruptions in the longitudinal continuity of said tubular member to provide only tortuous alternative paths for passage of acoustic energy, said interruptions forming sets of slots, each set of slots including individual slots disposed about the circumference of said member, and each set of slots being uniformly spaced from one another along the length of said member, said alternative paths being less than one quarter wave length of the predominant frequency of the acoustic energy traveling between said transducers.

References Cited by the Examiner

UNITED STATES PATENTS

| | | | |
|---|---|---|---|
| 2,233,992 | 3/41 | Wyckoff | 181—0.5 |
| 2,430,013 | 11/47 | Hansell | 340—8 |
| 2,437,456 | 3/48 | Bodine | 181—0.5 |
| 2,722,282 | 11/55 | McDonald | 181—0.5 |
| 2,754,925 | 7/56 | Burke | 340—8 |
| 2,757,358 | 7/56 | Ely | 340—18 |
| 2,790,964 | 4/57 | Schurman | 181—0.5 |
| 2,848,672 | 8/58 | Harris | 340—11 X |
| 2,903,673 | 9/59 | Harris | 340—8 |
| 2,922,483 | 1/60 | Harris | 340—8 |
| 3,018,465 | 1/62 | Harris | 340—8 |

SAMUEL FEINBERG, *Primary Examiner.*

CHESTER L. JUSTUS, CARL W. ROBINSON,
*Examiners.*